J. S. EDWARDS.
MACHINE FOR DISTRIBUTING FERTILIZERS.

No. 75,252. Patented Mar. 10, 1868.

Witnesses

Inventor

United States Patent Office.

JESSE S. EDWARDS, OF MEDFORD, NEW JERSEY.

*Letters Patent No. 75,252, dated March 10, 1868.*

IMPROVEMENT IN MACHINE FOR DISTRIBUTING FERTILIZERS.

*The Schedule referred to in these Letters Patent and making part of the same.*

TO ALL WHOM IT MAY CONCERN:

Be it known that I, JESSE S. EDWARDS, of Medford, in the county of Burlington, and State of New Jersey, have invented a new and useful Machine for Drilling Fertilizers in a Row; and I do hereby declare that the following is a full and exact description thereof, reference being had to the accompanying drawings, and to the letters of reference marked thereon.

The nature of my invention consists in providing at once a machine to fertilize the rows and plough the fertilizer in; at the same time, to regulate the amount of fertilizer to be used, and covering it at any depth desired.

To enable others skilled in the art to make and use my invention, I will proceed to describe its construction and operation.

I construct my fertilizer on a common cart-running gear, or any other running-gear suited to the purpose, with simple additions to suit the application of my invention thereto, whilst the additions made to suit these inventions do not affect the utility of the running-gear when placed under a cart-body, as before.

Figure 1:
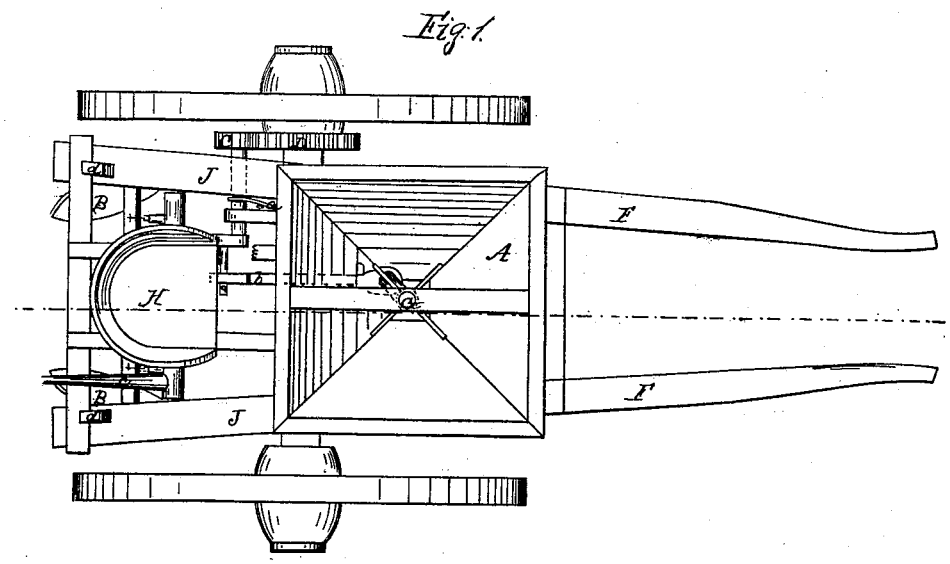
Figure 1 is a top view of the fertilizer.
Figure 2:
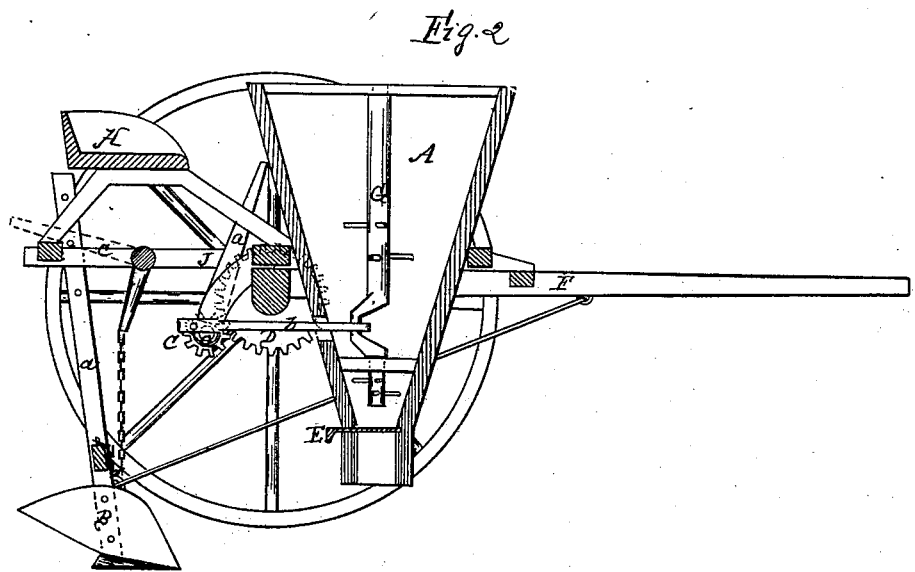
Figure 2 is a longitudinal sectional view of the same.

I insert the box A in the above-described running-gear, into which box the fertilizer is deposited, and fed through by the feeder G, kept in motion by the small cog-wheel C, in connection with the large cog-wheel D, which is attached to and receives its motive-power from the main wheel. The flow of the fertilizer is regulated by the slide E. By means of the lever $a$ the small cog-wheel C may be disconnected from the large cog-wheel D, and replaced at will, by means of the lever $a$, the advantages of which are apparent. The additions J to the shaft are to support the ploughs B and the necessary gear to them. These ploughs may be raised or lowered, so as to cover the fertilizer in the rows at any depth desired, the depth to be regulated by pins placed in the uprights $d$ above, and resting on the additions to the shafts, J, before described.

By means of the lever $a$, the workings of which may be seen on the accompanying drawings, the ploughs may be raised when the machine is not in operation, so that they may not encounter obstructions in passing over fields and roads. The driver, in his seat, marked H on the drawings, can easily govern the operations of the levers $b$ and $c$ without rising. The rods passing from the shafts to the ploughs act as a brace, giving them all the strength required.

*Claim.*

What I claim as my invention, and desire to secure by Letters Patent, is—

The arrangement of the hopper A, distributing-shaft G, wheels C and D, and ploughs B, as and for the purpose specified.

JESSE S. EDWARDS.

Witnesses:
WM. P. COPELAND,
WM. H. NEWTON.